July 11, 1939.  F. C. REGGIO  2,165,872

POWER TRANSMISSION MECHANISM

Filed Oct. 27, 1937  2 Sheets-Sheet 1

Inventor:
Ferdinando Carlo Reggio

Attorneys

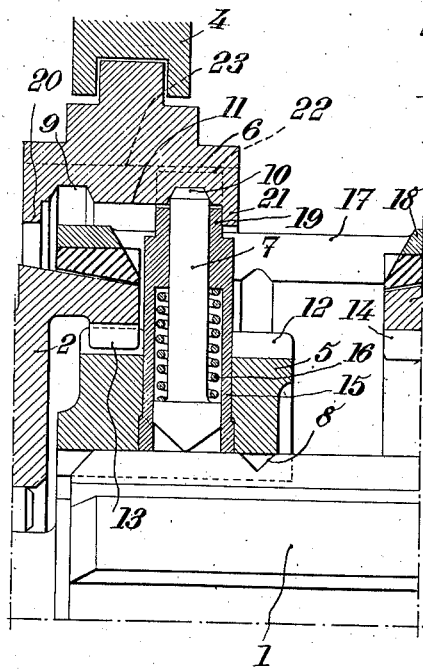
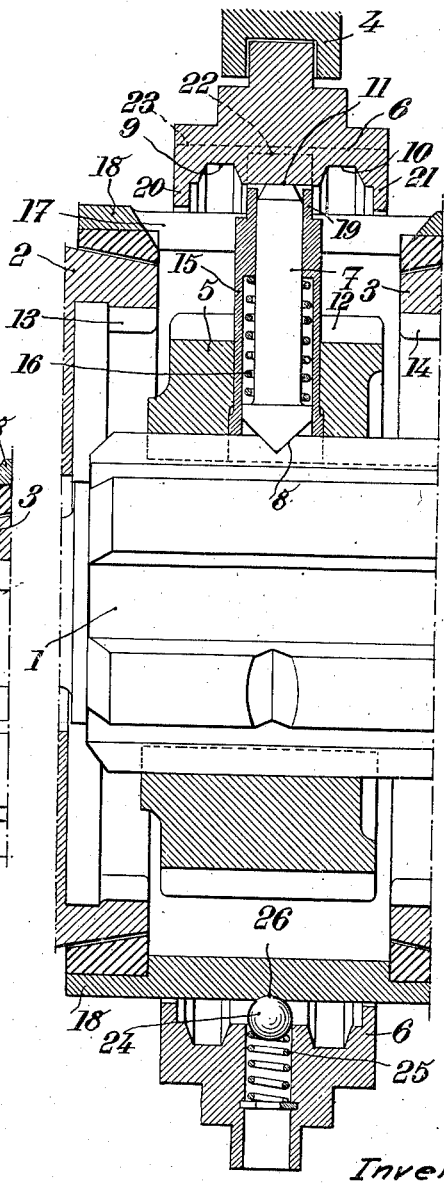

Patented July 11, 1939

2,165,872

UNITED STATES PATENT OFFICE 2,165,872

POWER TRANSMISSION MECHANISM

Ferdinando Carlo Reggio, Buffalo, N. Y.

Application October 27, 1937, Serial No. 171,373
In Belgium October 30, 1936

17 Claims. (Cl. 192—53)

The present invention relates to positive coupling devices including synchronizing means, that is to say mechanisms which, under the effect of an operating effort exerted thereon either manually or through control means which may be automatic or not, bring into play a frictional effect which tends to synchronize the speeds of revolution of the members to be coupled together before the positive coupling elements come into contact. The invention is more especially, although not exclusively, concerned with devices of this kind intended to be used in connection with variable ratio transmissions such for instance as the gear boxes of automobile vehicles.

The essential object of the present invention is to provide a device of this kind which is better adapted to meet the requirements of practice than the devices used for the same purpose up to the present time.

A first feature of the present invention consists in producing the successive actions of said friction means and said positive coupling means by the continuous movement of a single control member exerting independent actions on said means so that, during a first portion of this movement of said control member, the positive coupling means are locked in fixed position, at least a portion of the relative movement of the friction means in the direction corresponding to the cooperative contact of said friction means taking part during this first part of the movement of the control member, whereas the positive coupling means are subsequently released and moved into mesh with one another during the end of the movement of said control member.

Advantageously, in a preferred embodiment of the invention, the friction means are brought out of action before the release of the positive coupling means from the locked position thereof.

Other features of the present invention will result from the following detailed description of some specific embodiments of the invention.

Preferred embodiments of the present invention will be hereinafter described, with reference to the accompanying drawings, given merely by way of example, and in which:

Fig. 3 is a part sectional view, showing still the same device, with the parts thereof in relative positions corresponding to positive engagement or meshing;

Fig. 4 is a view, similar to Fig. 1, showing a device of the same kind made according to a second embodiment of the invention.

Figure 1:
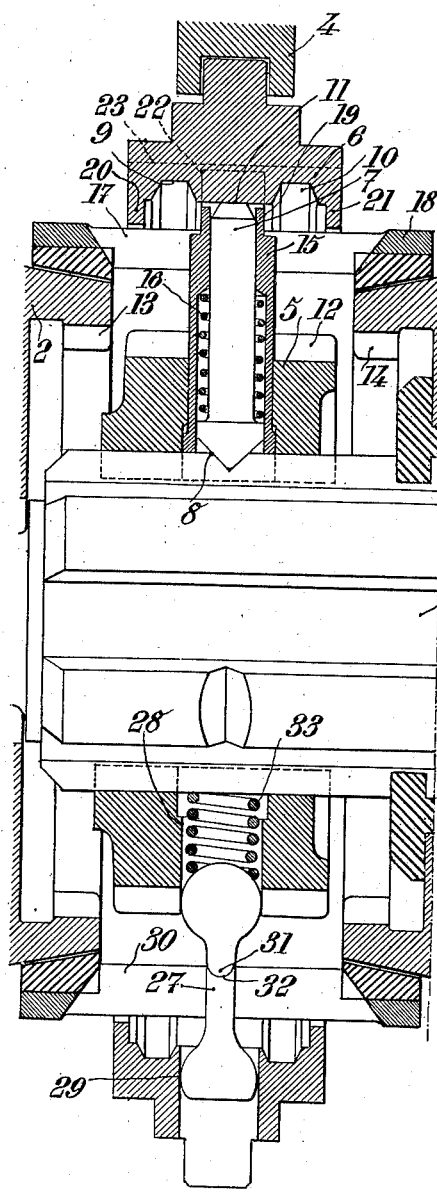
Fig. 1 is an axial sectional view of a double positive coupling device provided with synchronizing means, made according to a first embodiment of the present invention, the various elements of said device occupying relative positions corresponding to neutral gear.

The device illustrated by the drawings is intended to permit of coupling a shaft 1 with either of two pinions 2 and 3, coaxial with said shaft and freely rotatable with respect thereto.

This device is made in the following manner.

In a known manner, the mechanism includes the following parts:

(a) On the one hand, a first member, carrying the positive coupling elements, capable of meshing with either of pinions 2 and 3;

(b) On the other hand, a second member, carrying the friction elements adapted to coact with other friction elements carried by said pinions respectively;

These two members are adapted to move relatively to each other in an axial direction.

Instead of connecting these two members to each other in such manner that, during the first part of the movement for producing the meshing of the coupling means, both of these members are displaced, I provide connecting means between these members such that, during this first part of the operation, the first mentioned member is kept in position by suitable locking means whereas at least a portion of the movement of the second mentioned member in the direction producing the coming into contact of the respective friction elements takes place during this part of the operation, these actions on said respective members being effected independently from a single control member moved in a continuous manner and the displacement of the positive coupling member after its release being produced by the end of the displacement of said control member.

For this purpose, according to the present invention, I provide, between said control member (consisting for instance of a fork 4), the first mentioned member (carrying the positive coupling elements), and shaft 1, locking means such that said first mentioned member is locked to shaft 1 as long as fork 4 has not moved more than a first part of its stroke in the direction corresponding to meshing and that, during the further movement of said fork, corresponding to the end of its stroke, said fork produces the displacement of said first mentioned member until the respective positive coupling elements have been brought into mesh with one another.

On the other hand, I provide, between fork 4 and the second mentioned member (carrying the friction elements) temporary connecting means such that, during at least the beginning of the first part of the movement of fork 4, the friction elements carried by said second mentioned member are brought into contact with the friction elements carried by that of the two pinions 2, 3 with which shaft 1 is to be coupled, and that, during the further movement of said fork 4, said second mentioned member is no longer moved axially.

In order to obtain these results, the above mentioned locking means are advantageously made as follows:

The first mentioned member consists of sliding gear 5 adapted to move with a snug fit along suitable splines of shaft 1.

An annular member 6 is interposed between fork 4 and said sliding gear 5.

Said sliding gear is provided with a suitable number of radial locking fingers 7 adapted to slide with respect to the sliding gear and provided with pointed ends. Suitable notches 8 are provided in shaft 1 for receiving the inner ends of said fingers respectively. Notches 9 and 10 are provided in annular member 6 for receiving the outer ends of said fingers 7. Notch 8 and finger 7 are so dimensioned that, when the inner end of said finger is engaged in said notch, the outer end thereof is just applied against an abutment 11 provided between notches 9 and 10.

Then, it suffices to give this abutment 11, which extends between 9 and 10, a width such that, when sliding gear 5 is in neutral position, as long as annular member 6 has not been moved a sufficient distance, on one side or the other, from its middle position, said abutment 11 keeps the inner ends of locking fingers 7 engaged in notches 8, so that sliding gear 5 is axially locked on shaft 1.

On the contrary, when member 6 is moved from its middle position a distance sufficient for causing one of the notches 9, 10 to come in line with the outer end of each of the locking fingers 7, the latter, under the effect of the thrust exerted by fork 4 on member 6 and transmitted to sliding gear 5 through one of the abutments 20, 21 coming into contact with the prolonged portions 19 of guides 15 as shown in Fig. 3, can slide outwardly in their guides, so that their inner ends are moved from their respective notches 8 and sliding gear 5 can be moved toward the meshing position.

The specific embodiments illustrated by the drawings are further characterised by the following features:

Sliding gear 5 is provided with outer teeth 12 capable of coming into mesh with internal teeth 13, 14, carried by pinions 2 and 3, respectively.

Said sliding gear is further provided with radial guides 15 for locking fingers 7, and inside each of these guides, there is a spring 16 arranged to push the locking finger toward the axis of the whole system.

These guides are prolonged outwardly to such a distance that they can pass through longitudinal slots 17 provided in sleeve 18, which surrounds both the sliding gear 5 and the friction elements carried by pinions 2 and 3. This sleeve 18 itself carries, near its edges, the axially movable friction elements which constitute the second member above referred to.

These guides 15 are provided, outwardly of said sleeve 18, with prolonged portions 19 adapted to come, when the outer ends of locking fingers 7 are located opposite one of the notches 9, 10, into contact with abutments 20, 21, carried by member 6.

Finally, these guides are provided, beyond parts 19, with projections 22 engaging in longitudinal grooves 23 formed in member 6, in such manner as to cause said annular member 6 and sliding gear 5 to turn together.

With such an arrangement, all the conditions above set forth are complied with, and it suffices now to provide, between annular member 6 and sleeve 8, the above mentioned temporary connecting means.

Of course, these means may be made in many different manners. For instance, I may make use of the arrangement shown by Fig. 4, in which the means in question consist merely of a stopping ball 24 adapted to slide radially in annular member 6 and pushed toward the axis of the system by a spring 25 so as to engage it in a corresponding recess 26 of sleeve 18 when annular member 6 is in its middle position with respect to said sleeve 18. With such an arrangement, when annular member 6 is moved in a given direction away from its middle position, ball 24 first drives sleeve 18 together with itself until the friction elements come into engagement. Then, as annular member 6 is further moved, ball 24 escapes from recess 26 and annular member 6 can come into the position corresponding to the unlocking of sliding gear 5, said sliding gear being subsequently brought into mesh with one of the pinions 2, 3.

Figure 2:
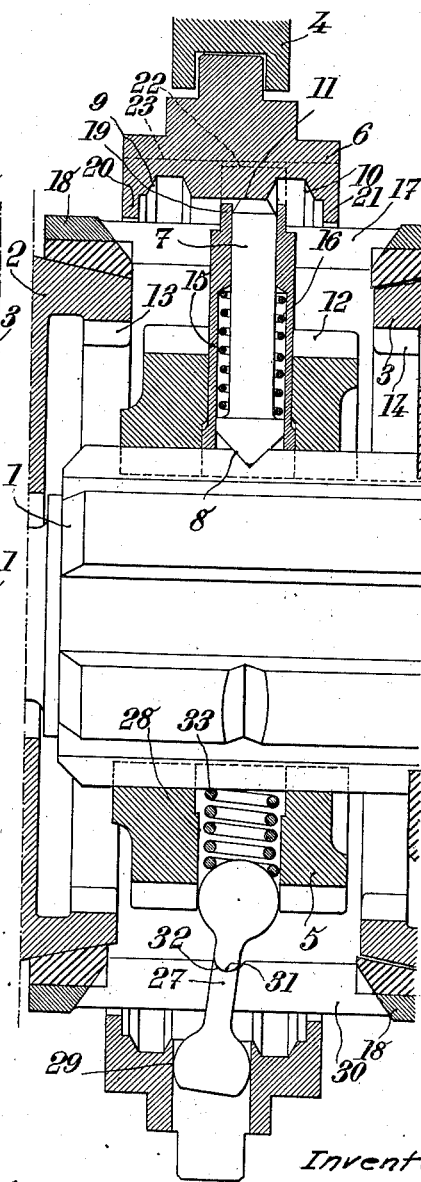
Fig. 2 is a similar view, showing the parts in different relative positions.

However, I consider that it is more advantageous to have recourse to an arrangement of the kind of that shown by Figs. 1 and 2, which employs effort multiplying elements, such an arrangement permitting to obtain, for a given thrust exerted on annular member 6, an increased thrust on the friction elements during the synchronizing period.

According to the embodiment shown by Figs. 1 to 3, the connection between annular member 6 and sleeve 18 is ensured by levers including each three points of contact with the elements of the device, one of these contacts being eliminated when the operating effort reaches a given value after the friction elements have been brought into contact. For instance, as more specifically shown by the drawings, the connecting means in question consist of radial levers 27, the inner end of each of which is engaged in a corresponding hole of sliding gear 5, the outer end being moved by annular member 6, and an intermediate point being, for certain positions of said lever 27, in engagement with sleeve 18.

It will be readily understood that, with this arrangement, as long as the sleeve is being driven along by the displacement of annular member 6, the length of its displacement is shorter than that of said annular member, and it suffices to arrange that levers 27 are in mesh with sleeve 18 until the respective friction means are in engagement for obtaining, from one part to the other, the desired multiplication of the force applied to annular member 6.

Advantageously, as shown by the drawings, the ends of each of these levers 27 are given a rounded shape and these ends are engaged in radial holes 28, 29 provided in sliding gear 5 and annular member 6, respectively.

I provide, for the passage of these levers through the sleeve 18, longitudinal slots 30, and levers 27 are provided with bosses 31 adapted to engage in recesses 32 provided in the inner face of sleeve 18 and on either side of slots 30.

It will be readily understood that if, now, there is provided, in the bottom of each of these recesses 28, a spring 33 tending to push out the inner end of the corresponding lever 27 engaged in said recess, bosses 31 are applied in the respective notches 32, except for extreme positions of annular member 6.

The operation of the connecting means between said annular member and sleeve 18 will then take place as follows:

When all the parts occupy their positions corresponding to the neutral position of the whole (Fig. 1) bosses 31 are engaged in recesses 32.

When annular member 6 is moved, for instance toward the left hand side, bosses 31 first drive the sleeve until the friction elements come into engagement (Fig. 2) and they permit of transmitting to said friction elements an effort equal to the product of that applied to annular member 6 and of the ratio of the respective arm lengths of levers 27.

When the effort exerted upon annular member 6 is gradually increased, as sleeve 18 is stopped by the engagement of the respective friction elements, bosses 31 are caused to escape from the corresponding notches 32, this being made possible by a compression of springs 33.

The axial effort on sleeve 18, causing the friction synchronizing elements to come and be maintained into engagement, is thus released, whereby the sleeve 18 may move to the disengaged position illustrated in Fig. 3.

From this time on, annular member 6 can be further moved toward the left, and, in the course of this displacement, it produces, as above explained, first the release of sliding member 5 from its locking engagement with shaft 1, and then the positive intermeshing of said sliding gear 5 with pinion 2 (Fig. 3).

Whatever be the specific embodiment that is chosen, I obtain, in any case, a system the operation of which results sufficiently clearly from the preceding description for making it unnecessary to give any further explanation.

It will be readily understood that the chief advantage of the devices which have just been described consists in the relatively small place occupied by said devices in the longitudinal direction, since, for the neutral position of the sliding gear, the latter may be an extremely short distance from the elements with which it is to be caused to mesh.

Another advantage of the device according to my invention is that the effort to be exerted for moving the parts away from neutral position tends to be reduced.

These advantages are obvious by comparison with the prior devices in which it was necessary to provide for a lost displacement of the positive coupling sliding member since the latter, at the beginning of the operation, moved together with the sliding member carrying the friction elements (and this either at the same speed or at a higher speed).

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the accompanying claims.

What I claim is:

1. A mechanical transmission device which comprises, in combination, two rotatable elements, shiftable means for positively intercoupling said elements, locking means for keeping said coupling means out of cooperative engagement, shiftable friction means for synchronizing the movement of said elements, a single control member having a neutral position, means operative by the beginning of the movement of said control member from its neutral position for shifting said friction means into operative relative position, and means, independently operative by said control member for successively bringing said locking means out of action in response to a displacement of said control member to a given position from said neutral position and shifting said positive coupling means into operation in response to a given displacement of said control member beyond said second mentioned position thereof.

2. A mechanical transmission device which comprises, in combination, two rotatable elements to be temporarily coupled together, shiftable means associated with said elements respectively for positively coupling them together, locking means for keeping said coupling means out of cooperative engagement, shiftable friction means associated with said elements respectively for synchronizing the rotary movements of said elements, a single control member having a neutral position, means operative by said control member for shifting said friction means into cooperative engagement respectively in response to the beginning of the movement of said control member from its neutral position, means, independently operative by said control member for successively bringing said locking means out of action in response to a displacement of said control member from said neutral position to a given position for which said friction means have already been shifted into cooperative engagement and shifting said positive coupling means into cooperative engagement in response to a further displacement of given amplitude of said control member beyond said second mentioned position thereof.

3. A mechanical transmission device which comprises, in combination, two rotatable elements to be temporarily coupled together, shiftable means associated with said elements respectively for positively coupling them together, a single control member having a neutral position, locking means for keeping said coupling means out of action when said control member is in neutral position, shiftable friction means associated with said rotatable elements respectively for synchronizing the rotary movements thereof, means operative by said control member for shifting said friction means into cooperative engagement respectively in response to the beginning of the movement of said control member from its neutral position and disengaging said friction means upon further movement of said control member, and means independently operative by said control member for successively bringing said locking means out of action in response to a displacement of said control member from said neutral position to a given position beyond that corresponding to said friction means being released and shifting said positive coupling means into cooperative engagement in response to a further displacement of given amplitude of said control member beyond said given position thereof.

4. A mechanical transmission device which comprises, in combination, two rotatable elements to be intermittently coupled together, corresponding positive coupling means carried by said elements respectively, at least one of said coupling means being movable with respect to the rotatable element that carries it, so as to be able to engage the positive coupling means carried by the other rotatable element, cooperative friction means carried by said rotatable elements respectively, at least one of said friction means being movable with respect to the rotatable element that carries it so as to be able to engage the friction means carried by the other element, a single control member having a neutral position, means for locking said movable positive control means in neutral position on the corresponding rotatable element, means operative by said control member for temporarily moving said movable friction means into engagement with the other friction means in response to the beginning of the movement of said control member from its neutral position, and means, independently operative by said control member, for successively bringing said locking means out of action in response to a displacement of said control member from said neutral position to a given position beyond that corresponding to said friction means being brought into cooperative engagement, and bringing said movable coupling means into engagement with other positive coupling means in response to a further displacement of given amplitude of said control member beyond said second mentioned position thereof.

5. A mechanical transmission device which comprises, in combination, a first rotatable element, a second rotatable element having its axis parallel to the first one and intended to be intermittently coupled with said first mentioned element, corresponding positive coupling means carried in fixed angular positions by said rotatable members respectively, the coupling means carried by said second mentioned rotatable element being slidable axially with respect thereto so as to be able to come into mesh with the coupling means carried by the first mentioned rotatable element, corresponding friction means carried by said rotatable elements respectively in fixed angular relation with respect thereto, the friction means carried by said second mentioned rotatable element being axially slidable with respect thereto so as to be able to come into contact and engagement with the friction means carried by the first mentioned rotatable element, a single control member having a neutral position, means for locking said axially slidable positive coupling means in fixed position with respect to said second mentioned rotatable element, temporary interconnecting means between said control member and said axially slidable friction means for bringing said last mentioned friction means into engagement with the other friction means in response to the beginning of said movement of said control member from its neutral position, and separate means, operative by said control member for successively bringing said locking means out of action in response to a displacement of said control member from said neutral position to a given position beyond that corresponding to said friction means being brought into cooperative engagement, and bringing said axially slidable coupling means into engagement with the other positive coupling means in response to a further displacement of given amplitude of said control member beyond said second mentioned position thereof.

6. A mechanical transmission device which comprises, in combination, a first rotatable element, a second rotatable element having its axis parallel to the first one and intended to be intermittently coupled with said first mentioned element, corresponding positive coupling means carried in fixed angular positions by said rotatable members respectively, the coupling means carried by said second mentioned rotatable element being slidable axially with respect thereto so as to be able to come into mesh with the coupling means carried by the first mentioned rotatable element, corresponding friction means carried by said rotatable elements respectively in fixed angular relation with respect thereto, the friction means carried by said second mentioned rotatable element consisting of an annular part axially slidable with respect to said second mentioned rotatable element so as to be able to come into engagement with the friction means carried by the first mentioned rotatable element, a single control member having a neutral position, an annular member surrounding said second mentioned rotatable element and angularly connected therewith, said annular member being adapted to move axially with respect to said second mentioned rotatable element under the action of said control member, radial locking fingers mounted on said positive locking means carried by the second mentioned rotatable element, radially slidable into and out of engagement with said second mentioned rotatable element, said annular member being provided on its inner part with a central abutment and two lateral circular grooves adapted to cooperate with the outer ends of said radial locking fingers, so that said fingers are in engagement with said second mentioned rotatable element when said annular member is in neutral position and has its central abutment applied against the outer ends of said fingers, and said fingers are out of engagement with said second mentioned rotatable element when said annular member has been moved axially so that one of said grooves is in register with said radial fingers and can receive them, walls carried by said annular member adjacent said grooves, guides for said radial fingers adapted to cooperate with said walls for transmitting the axial movement of said annular member to said axially slidable positive coupling means after said locking fingers have been moved out of engagement with said second mentioned rotatable element, and temporary interconnecting means between said annular member and said annular part carrying the axially slidable friction means adapted to bring said last mentioned friction means into engagement with the other friction means for the beginning of the displacement of said annular member, before the unlocking of said radial fingers.

7. A device according to claim 6 in which said temporary connecting means are adapted to perform an effort multiplying action.

8. In a synchronizing transmission, a friction clutch and a jaw clutch each having a movable element, a splined shaft upon which the movable jaw clutch element is slidably mounted, control means operatively connected to said movable jaw clutch element, cooperating means on said movable jaw clutch element and on said splined shaft for preventing relative axial displacement therebetween during the initial movement of said control means, and connecting means for resiliently transmitting the initial movement of said control means to said movable friction clutch element.

9. The invention defined by claim 8, said connecting means including means for multiplying the force transmitted to said movable friction clutch element.

10. In a synchronizing transmission, a splined shaft, jaw clutch elements one of which is axially movable upon said shaft, friction clutch elements one of which is axially movable, control means operatively connected to said movable jaw clutch element, means for locking said axially movable jaw clutch element to said splined shaft during the initial movement of said control means, and resilient means for transmitting the initial movement of said control means to said movable friction clutch element.

11. The invention defined by claim 10, said resilient means including leverage means interconnecting said control means with said movable friction clutch element and with said movable jaw clutch element.

12. A power transmission including a shaft, power transmission elements one of which is shiftable upon said shaft relative to the other, synchronizing means, control means, means for resiliently transmitting the initial movement of said control means to said synchronizing means, and locking means releasable upon further movement of said control means for interlocking said shiftable element with said shaft to keep said shiftable element out of operative engagement.

13. A power transmission including a shaft, power transmission elements one of which is shiftable upon said shaft relative to the other, control means, synchronizing means operable by initial movement of said control means, and cooperative locking means carried by said shaft and by said shiftable element for keeping said shiftable element out of operative engagement, said locking means being released upon further movement of said control means.

14. A power transmission including a splined shaft, spaced power transmission elements, a power transmitting element shiftable upon said shaft between the first mentioned elements and adapted to be moved into engagement with either of the first mentioned elements, control means, synchronizing means operable by initial movement of said control means, and cooperating means carried by said shiftable elements and by said shaft for keeping said shiftable element locked to said shaft out of operative engagement with said first two elements, said last mentioned means being released upon further movement of said control means.

15. The invention defined by claim 8, said connecting means including levers adapted to move said movable friction clutch element with an increased pressure, and yieldable means associated with said levers to limit said pressure.

16. The invention defined by claim 8, said connecting means including oscillating levers having three points adapted to engage said control means, said movable friction clutch element and said movable jaw clutch element respectively, and yieldable means associated with one of said three points of engagement and adapted to release said engagement under predetermined pressure.

17. In a synchronizing transmission, a friction clutch and a jaw clutch each having a movable element, a shaft upon which the movable jaw clutch element is slidably mounted, cooperating locking means carried by said movable jaw clutch element and by said shaft for holding said movable jaw clutch element in disengaged position, control means, and means for effecting in succession operation of said friction clutch, release of said locking means, and movement of said movable jaw clutch element by a continuous movement of said control means.

FERDINANDO CARLO REGGIO.